(12) United States Patent
Kim et al.

(10) Patent No.: US 11,260,724 B2
(45) Date of Patent: Mar. 1, 2022

(54) VEHICULAR AIR CONDITIONING SYSTEM AND METHOD FOR CONTROLLING THE SAME

(71) Applicant: Hanon Systems, Daejeon (KR)

(72) Inventors: Seong Hun Kim, Daejeon (KR); Hae Jun Lee, Daejeon (KR); Sung Je Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/467,227

(22) PCT Filed: Aug. 13, 2018

(86) PCT No.: PCT/KR2018/009238
§ 371 (c)(1),
(2) Date: Jun. 6, 2019

(87) PCT Pub. No.: WO2019/039783
PCT Pub. Date: Feb. 28, 2019

(65) Prior Publication Data
US 2020/0171917 A1    Jun. 4, 2020

(30) Foreign Application Priority Data

Aug. 21, 2017 (KR) .......................... 10-2017-0105170
Aug. 7, 2018 (KR) .......................... 10-2018-0091626

(51) Int. Cl.
*B60H 1/00* (2006.01)
*B60H 1/32* (2006.01)
*B60H 1/03* (2006.01)

(52) U.S. Cl.
CPC ..... *B60H 1/00899* (2013.01); *B60H 1/00042* (2013.01); *B60H 1/00064* (2013.01);
(Continued)

(58) Field of Classification Search
CPC .............. B60H 1/00899; B60H 1/3211; B60H 1/3213; B60H 1/00557; B60H 1/00564;
(Continued)

(56) References Cited

U.S. PATENT DOCUMENTS 2,780,077 A * 2/1957 Jacobs ............... B60H 1/00007
62/243
5,172,753 A * 12/1992 Kadle ...................... B60H 1/22
123/528
(Continued)

FOREIGN PATENT DOCUMENTS

JP    2003285620 A    10/2003
KR    100783427 B1    12/2007
(Continued)

OTHER PUBLICATIONS

Future Technology—In Wheel Motor—Nissan Motor Corporation (May 2015) (Year: 2015).*

*Primary Examiner* — Len Tran
*Assistant Examiner* — Jenna M Hopkins
(74) *Attorney, Agent, or Firm* — Norton Rose Fulbright US LLP; James R. Crawford (57) ABSTRACT

A vehicular air conditioning system includes: a heat pump side refrigerant circulation line including a compressor, a water-cooled heat exchanger, a heat pump mode expansion valve, an air-cooled heat exchanger, an air conditioner mode expansion valve and an evaporator, the heat pump side refrigerant circulation line configured to generate cold energy in the evaporator in an air conditioner mode and to generate heat in the water-cooled heat exchanger in a heat pump mode, the air-cooled heat exchanger configured to allow a refrigerant to exchange heat with an ambient air in the air conditioner mode and the heat pump mode; and a heat exchange air switching part configured to switch the type of
(Continued)

the air heat-exchanged in the air-cooled heat exchanger depending on the air conditioner mode or the heat pump mode.

11 Claims, 7 Drawing Sheets

(52) U.S. Cl.
CPC ...... *B60H 1/00328* (2013.01); *B60H 1/00557* (2013.01); *B60H 1/00564* (2013.01); *B60H 1/00849* (2013.01); *B60H 1/00921* (2013.01); *B60H 1/03* (2013.01); *B60H 1/3227* (2013.01); *B60H 1/00385* (2013.01); *B60H 1/3213* (2013.01); *B60H 2001/00157* (2013.01); *B60H 2001/00214* (2013.01); *B60H 2001/00221* (2013.01); *B60H 2001/00949* (2013.01)

(58) Field of Classification Search
CPC ........ B60H 1/00921; B60H 1/10; B60H 1/12; B60H 1/16; B60H 1/025; B60H 1/22; B60H 1/00849; B60H 1/00064; B60H 1/00042; B60H 1/00385; B60H 2001/00157; B60H 2001/00214; B60H 2001/00221; B60H 2001/00949
See application file for complete search history.

(56) References Cited

U.S. PATENT DOCUMENTS

| | | | |
|---|---|---|---|
| 5,284,025 A * | 2/1994 | Kajitani | B60L 1/003 62/160 |
| 6,913,067 B2 * | 7/2005 | Hesse | B60H 1/08 165/43 |
| 8,512,111 B2 * | 8/2013 | Cavanaugh | B60H 1/28 454/146 |
| 10,946,720 B2 * | 3/2021 | Sakane | F01P 7/10 |
| 2010/0126190 A1 * | 5/2010 | Ha | B60H 3/0092 62/78 |
| 2018/0312039 A1 * | 11/2018 | Sakane | F01P 7/10 |

FOREIGN PATENT DOCUMENTS

| | | |
|---|---|---|
| KR | 101015640 B1 | 2/2011 |
| KR | 101283592 B1 | 7/2013 |
| KR | 101731294 B1 | 4/2017 |

* cited by examiner

FIG. 1

Prior Art

VEHICULAR AIR CONDITIONING SYSTEM AND METHOD FOR CONTROLLING THE SAME

This application is a national phase under 35 U.S.C. § 371 of International Application No. PCT/KR2018/009238 filed Aug. 13, 2018, which claims the benefit of priority from Korean Application Nos. 10-2017-0105170 filed on Aug. 21, 2017 and 10-2018-0091626 filed on Aug. 7, 2018. The entire contents of these applications are incorporated herein by reference in their entirety.

TECHNICAL FIELD

The present invention relates to a vehicular air conditioning system and a method for controlling a vehicular air conditioning system and, more particularly, to a vehicular air conditioning system configured to maximize the heat exchange efficiency of an air-cooled heat exchanger and capable of enhancing the air conditioning efficiency of a heat pump and the heat pump efficiency and consequently improving the heating/cooling performance of the heat pump to enhance the heating/cooling performance of a passenger compartment, and a method for controlling a vehicular air conditioning system.

BACKGROUND ART

Recently, a variety of air conditioning systems for efficiently cooling and heating a passenger compartment have been developed. In particular, various air conditioning systems for efficiently cooling and heating a passenger compartment of an eco-friendly electric vehicle such as an electric vehicle, a hybrid vehicle, a fuel cell vehicle or the like are being developed. As an example thereof, there is known a water-heated heat pump air conditioning system.

Figure 1:
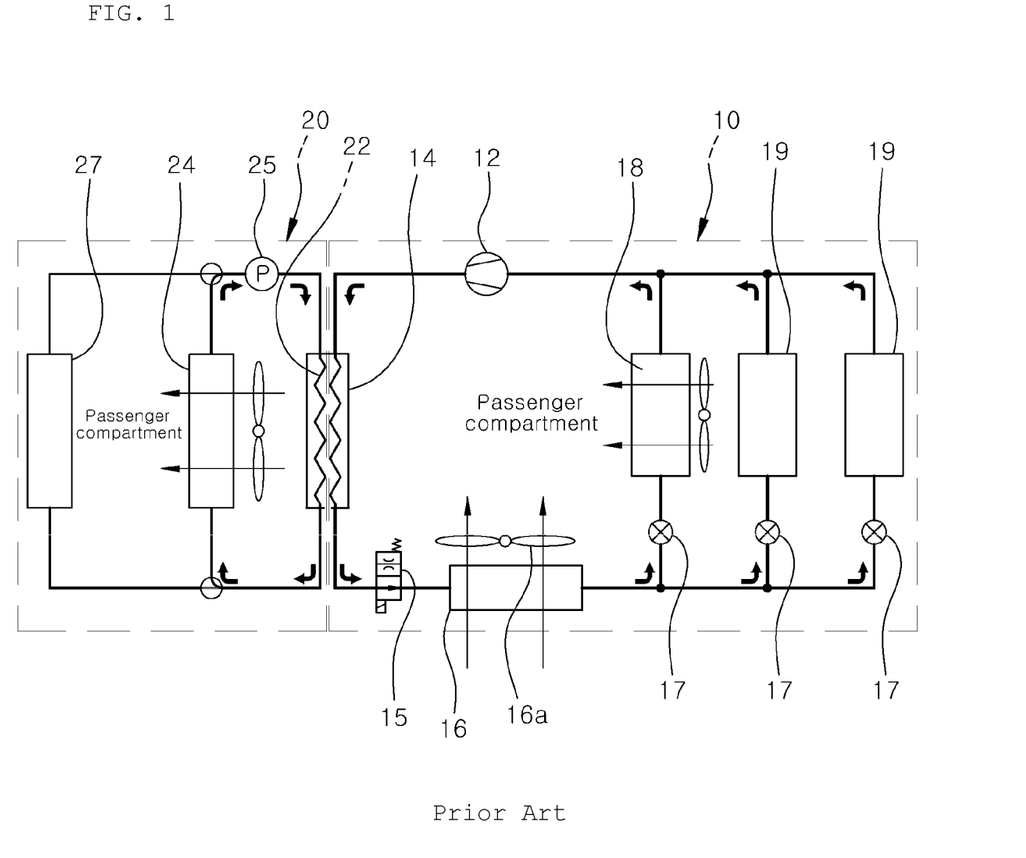
FIG. 1 is a view showing a conventional vehicular air conditioning system.

As shown in FIG. 1, the water-heated heat pump air conditioning system includes a heat pump side refrigerant circulation line 10 and a heater core side refrigerant circulation line 20.

The heat pump side refrigerant circulation line 10 includes a compressor 12, a water-cooled heat exchanger 14, a heat pump mode expansion valve 15, an air-cooled heat exchanger 16, a plurality of air conditioner mode expansion valves 17 installed in parallel with each other, an evaporator 18 installed on the downstream side of the air conditioner mode expansion valves 17, and a plurality of chillers 19 installed on the downstream side of the air conditioner mode expansion valves 17.

In an air conditioner mode for cooling purposes, the heat pump side refrigerant circulation line 10 allows the heat pump mode expansion valve 15 to be opened so that the refrigerant can circulate without going through the heat pump mode expansion valve 15. By virtue of the refrigerant circulation, cold energy having a low temperature is generated in the evaporator 18 and the chillers 19. The cold energy thus generated is transferred to a passenger compartment, a battery (not shown) and electric components (not shown), thereby cooling the passenger compartment, the battery and the electric components.

In a heat pump mode for heating purposes, the heat pump mode expansion valve 15 is turned on so that the refrigerant can pass and circulate through the heat pump mode expansion valve 15. By virtue of the refrigerant circulation, heat having a high temperature is generated in the water-cooled heat exchanger 14 and is transferred to the heater core side cooling water circulation line 20. Thus, the heat having a high temperature is radiated into the passenger compartment through a heater core 24 of the heater core side cooling water circulation line 20, thereby heating the passenger compartment.

In this regard, the air-cooled heat exchanger 16 serves as a condenser in the air conditioner mode, and serves as an evaporator in the heat pump mode. In the air conditioner mode, the heat on the side of the air-cooled heat exchanger 16 serving as a condenser is radiated while exchanging heat with the air drawn by a cooling fan 16a. In the heat pump mode, the cold energy on the side of the air-cooled heat exchanger 16 serving as an evaporator is radiated while exchanging heat with the air drawn by the cooling fan 16a.

The heater core side cooling water circulation line 20 includes an internal flow path 22 formed in the water-cooled heat exchanger 14 of the heat pump side refrigerant circulation line 10, a heater core 24 installed inside a passenger compartment, and a water pump 25 for causing cooling water to circulate between the heater core 24 and the internal flow path 22 of the water-cooled heat exchanger 14.

In the heat pump mode, the heater core side cooling water circulation line 20 causes the cooling water to circulate between the water-cooled heat exchanger 14 of the heat pump side refrigerant circulation line 10 and the heater core 24 so that the heat generated in the water-cooled heat exchanger 14 of the heat pump side refrigerant circulation line 10 is transferred to the heater core 24. Thus, the heat having a high temperature transferred to the heater core 24 is radiated into the passenger compartment to heat the passenger compartment.

In the air conditioner mode, the heater core side cooling water circulation line 20 transfers the heat generated in the water-cooled heat exchanger 14 to a radiator 27. Therefore, the heat generated in the water-cooled heat exchanger 14 is radiated by the radiator 27.

According to the water-heated heat pump air conditioning system having such a configuration, it is possible to heat the passenger compartment without having to use the cooling water of an engine. Therefore, the water-heated heat pump air conditioning system is very suitable for heating or cooling a passenger compartment of an environmentally friendly electric vehicle.

In the water-heated heat pump air conditioning system, it is important to enhance the heating/cooling efficiency of the evaporator 18 of the water-cooled heat exchanger 14, thereby enhancing the passenger compartment heating/cooling performance.

Since the fuel efficiency of an environmentally friendly vehicle is significantly affected by the heating/cooling efficiency of an air conditioning system, it is necessary to improve the heating/cooling efficiency of the air conditioning system in order to enhance the fuel efficiency of the vehicle.

SUMMARY

In view of the aforementioned problems inherent in the related art, it is an object of the present invention to provide a vehicular air conditioning system capable of enhancing the heating/cooling efficiency through the improvement of a structure and consequently improving the passenger compartment heating/cooling performance, and a method for controlling a vehicular air conditioning system.

Another object of the present invention is to provide a vehicular air conditioning system capable of improving the passenger compartment heating/cooling performance while improving the fuel efficiency, and a method for controlling a vehicular air conditioning system.

According to one aspect of the present invention, there is provided a vehicular air conditioning system, comprising: a heat pump side refrigerant circulation line including a compressor, a water-cooled heat exchanger, a heat pump mode expansion valve, an air-cooled heat exchanger, an air conditioner mode expansion valve and an evaporator, the heat pump side refrigerant circulation line configured to generate cold energy in the evaporator in an air conditioner mode and to generate heat in the water-cooled heat exchanger in a heat pump mode, the air-cooled heat exchanger configured to allow a refrigerant to exchange heat with an ambient air in the air conditioner mode and the heat pump mode; and a heat exchange air switching part configured to switch the type of the air heat-exchanged in the air-cooled heat exchanger depending on the air conditioner mode or the heat pump mode.

In the system, the air-cooled heat exchanger may be configured to cause a high-temperature refrigerant introduced into the heat pump mode expansion valve to exchange heat with an ambient air so as to reduce a temperature of the refrigerant in the air conditioner mode and configured to cause a low-temperature refrigerant discharged from the heat pump mode expansion valve to exchange heat with an ambient air so as to increase a temperature of the refrigerant, and the heat exchange air switching part may be configured to introduce one of different types of air toward the air-cooled heat exchanger depending on the air conditioner mode or the heat pump mode so that the one of different types of air can exchange heat with the air-cooled heat exchanger depending on a mode state.

In the system, the heat exchange air switching part may be configured to introduce one of air having different temperatures toward the air-cooled heat exchanger depending on the air conditioner mode or the heat pump mode so that the one of air having different temperatures can exchange heat with the air-cooled heat exchanger depending on the mode state.

In the system, the heat exchange air switching part may be configured to switch the air exchanging heat with the air-cooled heat exchanger to an engine room air or an outdoor air depending on the air conditioner mode or the heat pump mode.

In the system, the heat exchange air switching part may include: a cooling fan configured to draw an air toward the air-cooled heat exchanger; an engine room air introduction flow path configured to introduce the engine room air toward the air-cooled heat exchanger; an outdoor air introduction flow path configured to introduce the outdoor air toward the air-cooled heat exchanger; a heat exchange air switching door installed between the engine room air introduction flow path and the outdoor air introduction flow path so as to block one of the engine room air introduction flow path and the outdoor air introduction flow path; and a control part configured to control the heat exchange air switching door to a position at which the engine room air introduction flow path is blocked or a position at which the outdoor air introduction flow path is blocked, depending on the air conditioner mode or the heat pump mode.

In the system, the control part may be configured to, in the air conditioner mode, control the heat exchange air switching door in such a direction as to block the engine room air introduction flow path so that the outdoor air can be introduced toward the air-cooled heat exchanger to exchange heat therewith, and may be configured to, in the heat pump mode, control the heat exchange air switching door in such a direction as to block the outdoor air introduction flow path so that the engine room air can be introduced toward the air-cooled heat exchanger to exchange heat therewith.

According to another aspect of the present invention, there is provided a method for controlling a vehicular air conditioning system which comprises a heat pump side refrigerant circulation line including a compressor, a water-cooled heat exchanger, a heat pump mode expansion valve, an air-cooled heat exchanger, an air conditioner mode expansion valve and an evaporator, the heat pump side refrigerant circulation line configured to generate cold energy in the evaporator in an air conditioner mode and to generate heat in the water-cooled heat exchanger in a heat pump mode, the method comprising: (a) allowing the air-cooled heat exchanger to exchange heat with an ambient air in the air conditioner mode and the heat pump mode while switching the type of the air heat-exchanged in the air-cooled heat exchanger depending on the air conditioner mode or the heat pump mode.

In (a), one of air having different temperatures may be introduced toward the air-cooled heat exchanger depending on the air conditioner mode or the heat pump mode so that the one of the airs having different temperatures can exchange heat with the air-cooled heat exchanger depending on a mode state.

In (a), an engine room air or an outdoor air may be introduced toward the air-cooled heat exchanger depending on the air conditioner mode or the heat pump mode.

In (a), the outdoor air may be introduced toward the air-cooled heat exchanger in the air conditioner mode so that the air-cooled heat exchanger can exchange heat with the outdoor air, and the engine room air may be introduced toward the air-cooled heat exchanger in the heat pump mode so that the air-cooled heat exchanger can exchange heat with the engine room air.

According to the vehicular air conditioning system and the method for controlling the vehicular air conditioning system according to the present invention, the air-cooled heat exchanger of the heat pump side refrigerant circulation line is caused to exchange heat with the air. In the air conditioner mode, the air-cooled heat exchanger is caused to exchange heat with the outdoor air existing outside the passenger compartment and having a relatively low temperature. In the heat pump mode, the air-cooled heat exchanger is caused to exchange heat with the engine room air existing in the engine room and having a relatively high temperature. This makes it possible to enhance the heat exchange efficiency of the air-cooled heat exchanger as far as possible.

Furthermore, since the heat exchange efficiency of the air-cooled heat exchanger can be enhanced as far as possible, it is possible to enhance the air conditioner efficiency and the heat pump efficiency of the heat pump side refrigerant circulation line, consequently improving the heating/cooling performance of the heat pump side refrigerant circulation line.

Moreover, since the heating/cooling performance of the heat pump side refrigerant circulation line can be improved, it is possible to enhance the passenger compartment heating/cooling performance.

In addition, since the passenger compartment heating/cooling performance can be enhanced by improving the heating/cooling performance of the heat pump side refrigerant circulation line, it is possible to improve the vehicle fuel efficiency.

DETAILED DESCRIPTION

Preferred embodiments of a vehicular air conditioning system and a method for controlling a vehicular air conditioning system according to the present invention will now be described in detail with reference to the accompanying drawings (The same components as those of the prior art described above will be designated by like reference numerals).

Prior to describing features of a vehicular air conditioning system according to the present invention, a water-cooled heat pump air conditioning system will be briefly described with reference to FIGS. 2 to 4.

Figure 2:
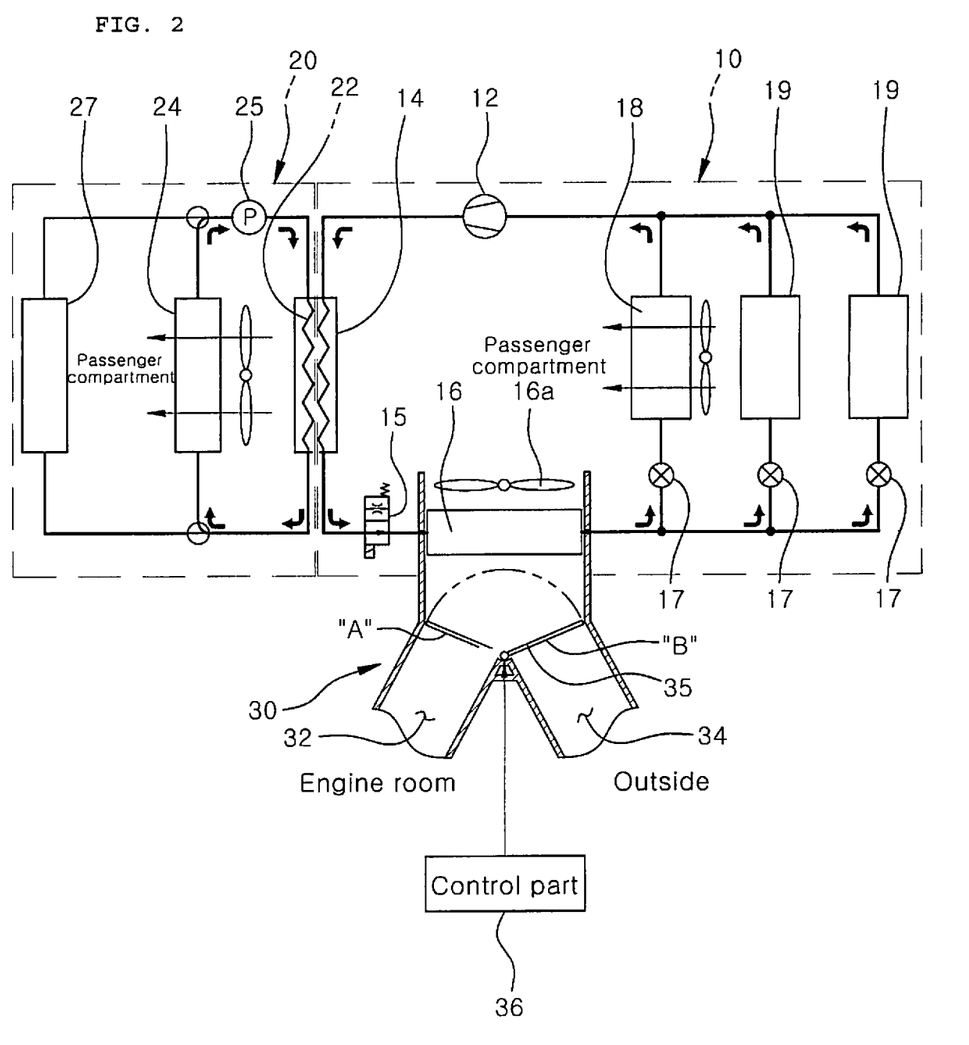
FIG. 2 is a view showing a vehicular air conditioning system according to the present invention.

As shown in FIG. 2, the water-cooled heat pump air conditioning system includes a heat pump side refrigerant circulation line 10 and a heater core side cooling water circulation line 20.

The heat pump side refrigerant circulation line 10 includes a compressor 12, a water-cooled heat exchanger 14, a heat pump mode expansion valve 15, an air-cooled heat exchanger 16, a plurality of air conditioner mode expansion valves 17 installed in parallel with each other, an evaporator 18 installed on the downstream side of the air conditioner mode expansion valves 17, and a plurality of chillers 19 installed on the downstream side of the air conditioner mode expansion valves 17.

Figure 3:
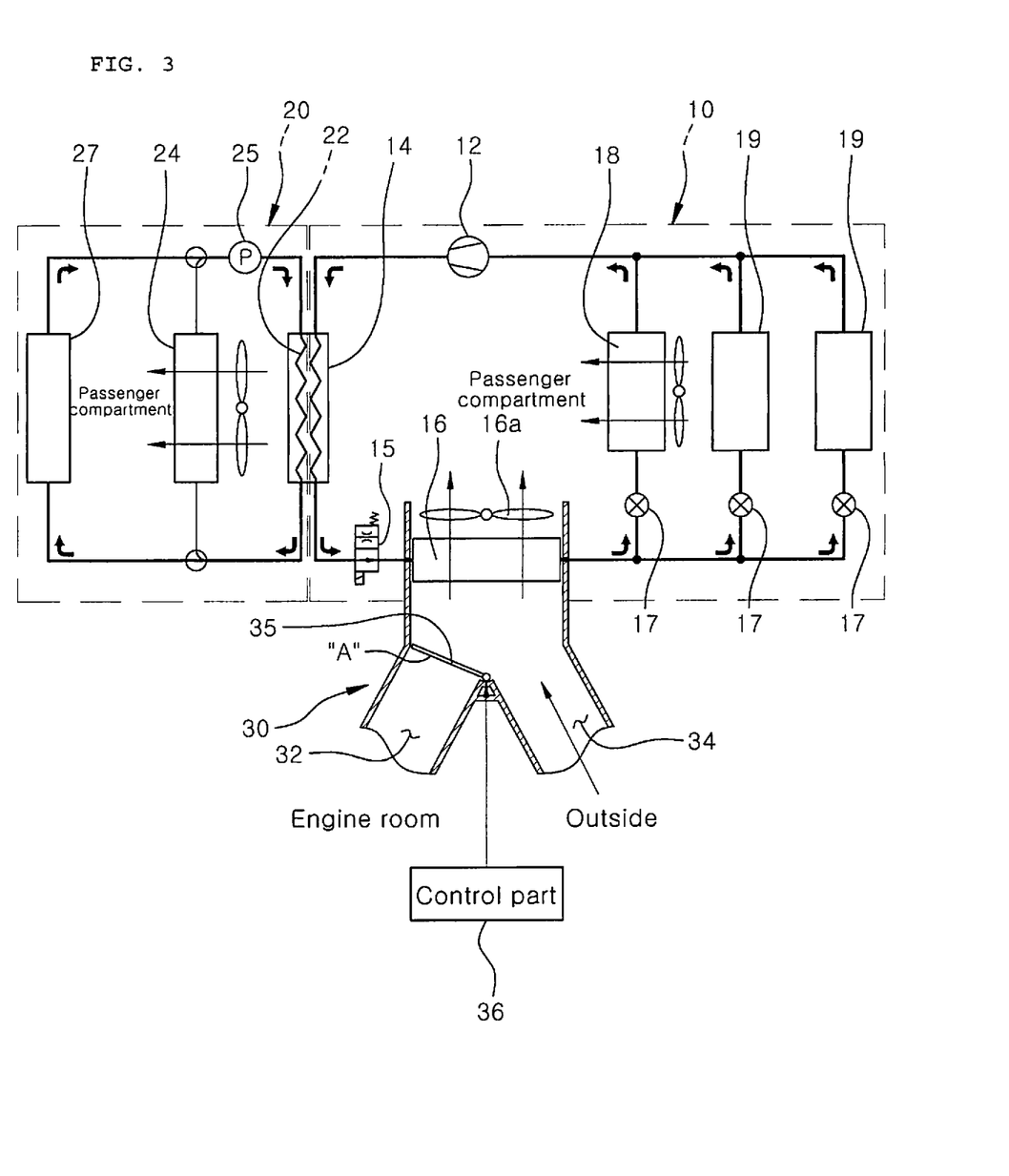
FIG. 3 is a view showing an operation example of the vehicular air conditioning system according to the present invention, which is operated in an air conditioner mode.

In the air conditioner mode, as shown in FIG. 3, the heat pump side refrigerant circulation line 10 causes the heat pump mode expansion valve 15 to be opened.

Therefore, the refrigerant is caused to circulate without going through the heat pump mode expansion valve 15. By virtue of such refrigerant circulation, cold energy having a low temperature is generated in the evaporator 18 and the chillers 19 and is transferred to a passenger compartment, a battery (not shown) and electric components (not shown), thereby cooling the passenger compartment, the battery and the electric components.

Figure 4:
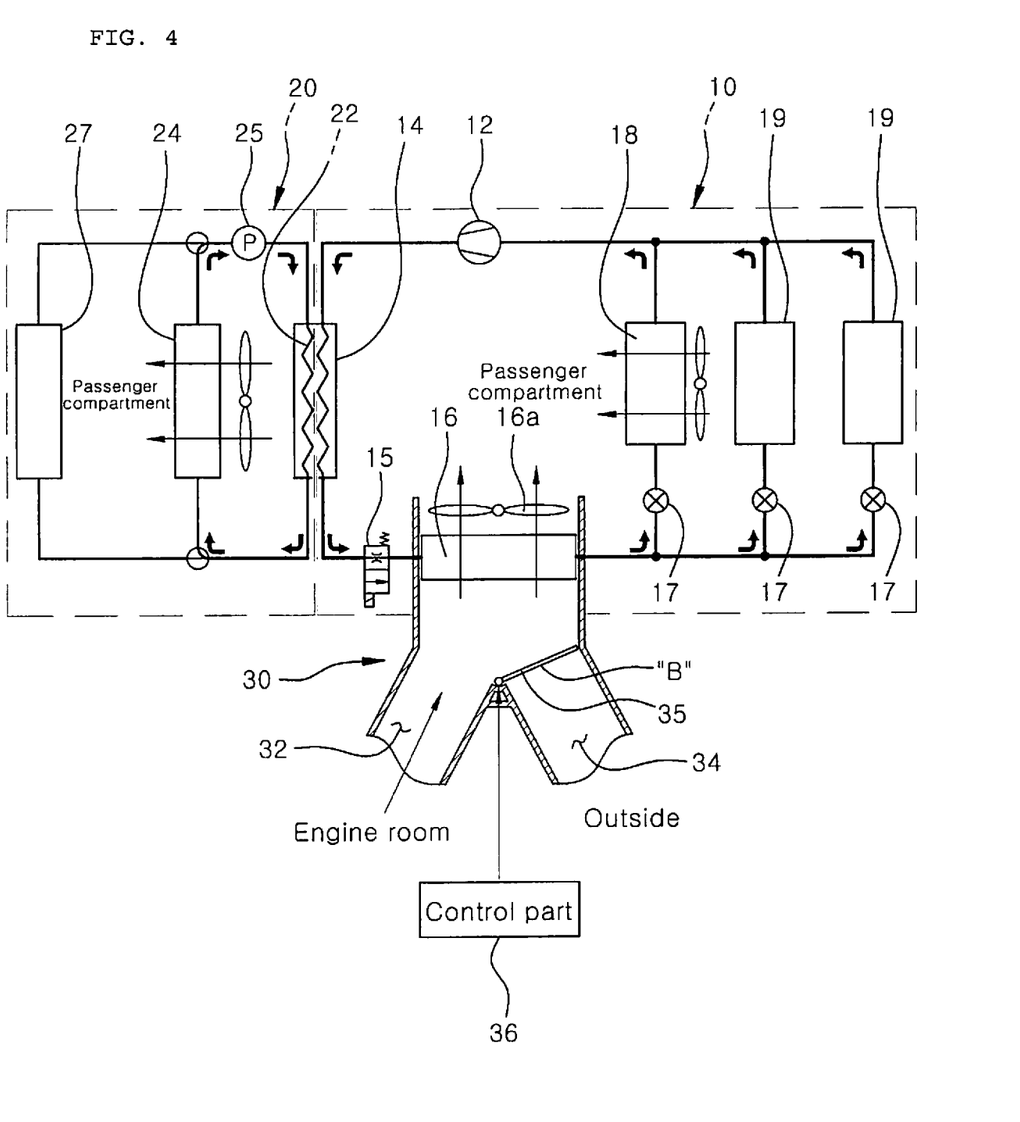
FIG. 4 is a view showing an operation example of the vehicular air conditioning system according to the present invention, which is operated in a heat pump mode.

In the heat pump mode, as shown in FIG. 4, the heat pump mode expansion valve 15 is turned on.

Therefore, the refrigerant is caused to circulate while passing through the heat pump mode expansion valve 15. By virtue of such refrigerant circulation, heat having a high temperature is generated in the water-cooled heat exchanger 14 and is transferred to the heater core side cooling water circulation line 20. Thus, the heat having a high temperature transferred to the heater core side cooling water circulation line 20 is radiated into the passenger compartment through the heater core 24.

In this regard, the air-cooled heat exchanger 16 serves as a condenser in the air conditioner mode, and serves as an evaporator in the heat pump mode. In the air conditioner mode, the heat on the side of the air-cooled heat exchanger 16 serving as a condenser is radiated while exchanging heat with the air drawn by a cooling fan 16a. In the heat pump mode, the cold energy on the side of the air-cooled heat exchanger 16 serving as an evaporator is radiated while exchanging heat with the air drawn by the cooling fan 16a.

The heater core side cooling water circulation line 20 includes an internal flow path 22 formed in the water-cooled heat exchanger 14 of the heat pump side refrigerant circulation line 10, a heater core 24 installed inside a passenger compartment, and a water pump 25 for causing cooling water to circulate between the heater core 24 and the internal flow path 22 of the water-cooled heat exchanger 14.

In the heat pump mode, the heater core side cooling water circulation line 20 causes the cooling water to circulate between the water-cooled heat exchanger 14 of the heat pump side refrigerant circulation line 10 and the heater core 24 so that the heat generated in the water-cooled heat exchanger 14 of the heat pump side refrigerant circulation line 10 is transferred to the heater core 24. Thus, the heat having a high temperature transferred to the heater core 24 is radiated into the passenger compartment to heat the passenger compartment.

In the air conditioner mode, the heater core side cooling water circulation line 20 transfers the heat generated in the water-cooled heat exchanger 14 to a radiator 27. Therefore, the heat generated in the water-cooled heat exchanger 14 is radiated by the radiator 27.

Next, the features of the vehicular air conditioning system according to the present invention will be described in detail with reference to FIGS. 2 to 6.

Referring first to FIG. 2, the vehicular air conditioning system according to the present invention is configured to introduce an air into the air-cooled heat exchanger 16 of the heat pump side refrigerant circulation line 10 so as to exchange heat with the air-cooled heat exchanger 16 in the air conditioner mode and the heat pump mode. The vehicular air conditioning system further includes a heat exchange air switching part 30 configured to switch the type of the air heat-exchanged in the air-cooled heat exchanger 16 depending on the mode state.

The heat exchange air switching part 30 is configured to switch the air heat-exchanged in the air-cooled heat exchanger 16 to an engine room air existing in an engine room or an outdoor air existing outside a passenger compartment depending on the mode state. The heat exchange air switching part 30 includes an engine room air introduction flow path 32 for introducing the engine room air toward the upstream side of the air-cooled heat exchanger 16 and an outdoor air introduction flow path 34 for introducing the outdoor air toward the upstream side of the air-cooled heat exchanger 16.

The engine room air introduction flow path 32 is configured to bring the upstream side of the air-cooled heat exchanger 16 into communication with the engine room so that the air in the engine room can be introduced into the air-cooled heat exchanger 16. Specifically, when the cooling fan 16a of the air-cooled heat exchanger 16 is operated, the air existing in the engine room is drawn and introduced into the air-cooled heat exchanger 16 by the cooling fan 16a.

Therefore, the air introduced from the engine room can exchange heat with the air-cooled heat exchanger 16.

The outdoor air introduction flow path 34 is configured to bring the outside of the passenger compartment into communication with the upstream side of the air-cooled heat exchanger 16 so that the outdoor air existing outside the passenger compartment can be introduced into the air-cooled heat exchanger 16.

Specifically, when the cooling fan 16a of the air-cooled heat exchanger 16 is operated, the air existing outside the passenger compartment is drawn and introduced into the air-cooled heat exchanger 16 by the cooling fan 16a.

Therefore, the air introduced from the outside of the passenger compartment can exchange heat with the air-cooled heat exchanger 16.

Referring again to FIG. 2, the heat exchange air switching part 30 further includes a heat exchange air switching door 35 installed so as to be rotatable between the engine room air introduction flow path 32 and the outdoor air introduction flow path 34.

The heat exchange air switching door 35 is rotatable between an outdoor air introduction position "A" at which the heat exchange air switching door 35 blocks the engine room air introduction flow path 32 and an engine room air introduction position "B" at which the heat exchange air switching door 35 blocks the outdoor air introduction flow path 34.

The heat exchange air switching door 35 makes rotational movement between the outdoor air introduction position "A" and the engine room air introduction position "B" to block one of the engine room air introduction flow path 32 and the outdoor air introduction flow path 34 while opening the other.

Therefore, one of the engine room air and the outdoor air can be introduced into the air-cooled heat exchanger 16 of the heat pump side refrigerant circulation line 10.

The vehicular air conditioning system according to the present invention further includes a control part 36 configured to control the heat exchange air switching door 35.

The control part 36 is provided with a microprocessor and configured to control the position of the heat exchange air switching door 35 according to the air conditioner mode or the heat pump mode.

In the air conditioner mode, as shown in FIG. 3, the control part 36 controls the position of the heat exchange air switching door 35 to the outdoor air introduction position "A" so that the outdoor air can be introduced into the air-cooled heat exchanger 16 of the heat pump side refrigerant circulation line 10.

Thus, in the air conditioner mode, the air-cooled heat exchanger 16 serving as a condenser can exchange heat with the outdoor air having a lower temperature than the engine room air.

As a result, it is possible to enhance the cooling efficiency of the refrigerant flowing along the internal flow path of the air-cooled heat exchanger 16. This makes it possible to further reduce the temperature of the refrigerant introduced from the air-cooled heat exchanger 16 into the evaporator 18 and the chillers 19.

This makes it possible to enhance the cooling efficiency of the evaporator 18 and the chillers 19, thereby improving the passenger compartment cooling performance.

In the heat pump mode, as shown in FIG. 4, the control part 36 controls the position of the heat exchange air switching door 3 5 to the engine room air introduction position "B" so that the engine room air can be introduced into the air cooled heat exchanger 16 of the heat pump side refrigerant circulation line 10.

Thus, in the heat pump mode, the air-cooled heat exchanger 16 serving as an evaporator can exchange heat with the engine room air having a higher temperature than the outdoor air.

As a result, it is possible to enhance the cooling efficiency of the refrigerant flowing along the internal flow path of the air-cooled heat exchanger 16. This makes it possible to further increase the temperature of the refrigerant introduced from the air-cooled heat exchanger 16 into the compressor 12.

This makes it possible to enhance the efficiency of the heat pump, thereby increasing the heating temperature in the water-cooled heat exchanger 14. Accordingly, it is possible to supply the heat having a higher temperature to the heater core side cooling water circulation line 20, consequently improving the passenger compartment heating efficiency.

Figure 5:
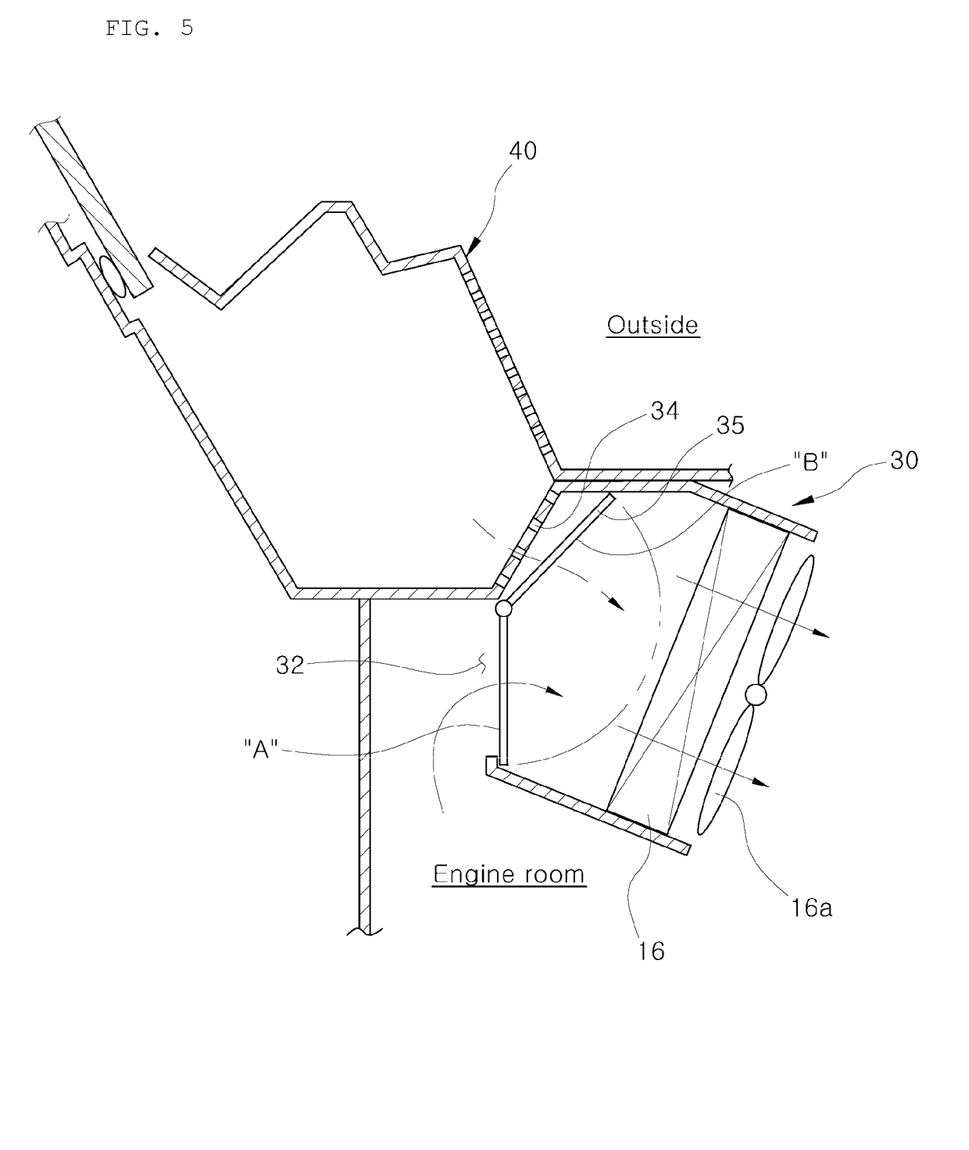
FIG. 5 is a view showing an installation example of a heat exchange air switching part that constitutes the vehicular air conditioning system according to the present invention.

As shown in FIG. 5, the heat exchange air switching part 30 having such a configuration is preferably installed on the side of a cowl 40.

That is to say, the outdoor air introduction flow path 34 is configured to communicate with the outside of the passenger compartment, and the engine room air introduction flow path 32 is configured to communicate with engine room.

Therefore, when the cooling fan 16a is operated, the outdoor air existing on the side of the cowl 40 or the engine room air may be selectively supplied. It goes without saying that the air-cooled heat exchanger 16 of the heat pump side refrigerant circulation line 10 has to be installed in the engine room on the side of the cowl 40.

Figure 6:
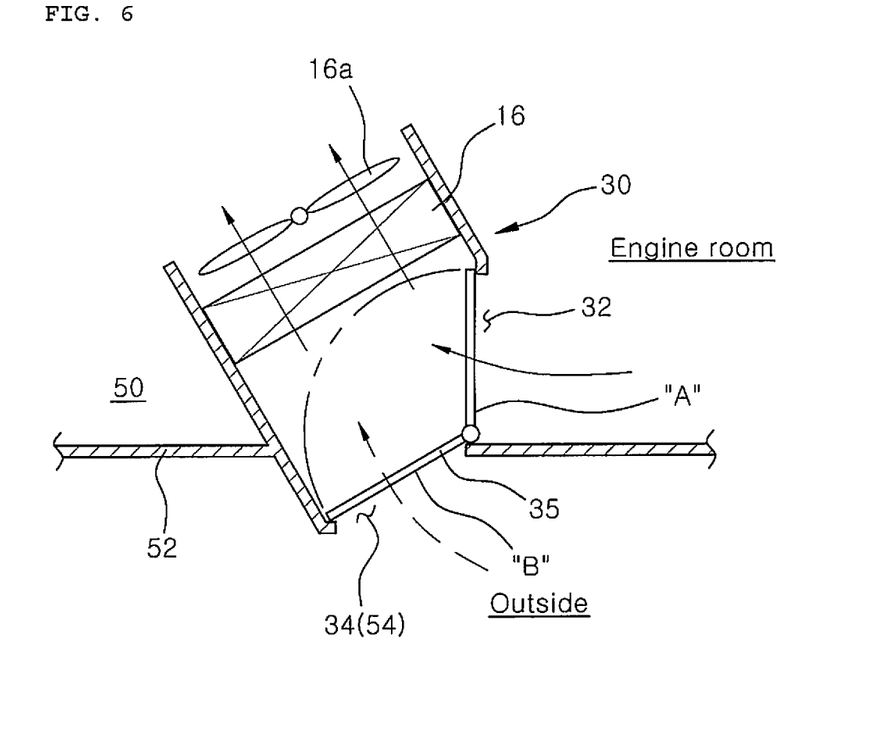
FIG. 6 is a view showing another installation example of the heat exchange air switching part that constitutes the vehicular air conditioning system according to the present invention.

Alternatively, the heat exchange air switching part 30 may be installed on a floor surface 50 of a vehicle as shown in FIG. 6.

That is to say, the outdoor air introduction flow path 34 may be configured to communicate with the outside of the passenger compartment through an air intake port 54 of an undercover of a vehicle, and the engine room air introduction flow path 32 may be configured to communicate with the engine room.

Therefore, when the cooling fan 16a is operated, the outdoor air existing on the side of the undercover 52 or the engine room air may be selectively supplied. It goes without saying that the air-cooled heat exchanger 16 of the heat pump side refrigerant circulation line 10 has to be installed on the floor surface 50 of the passenger compartment.

Next, an air conditioning control method using the vehicular air conditioning system having the aforementioned configuration will be described with reference to FIGS. 3, 4 and 7.

Figure 7:
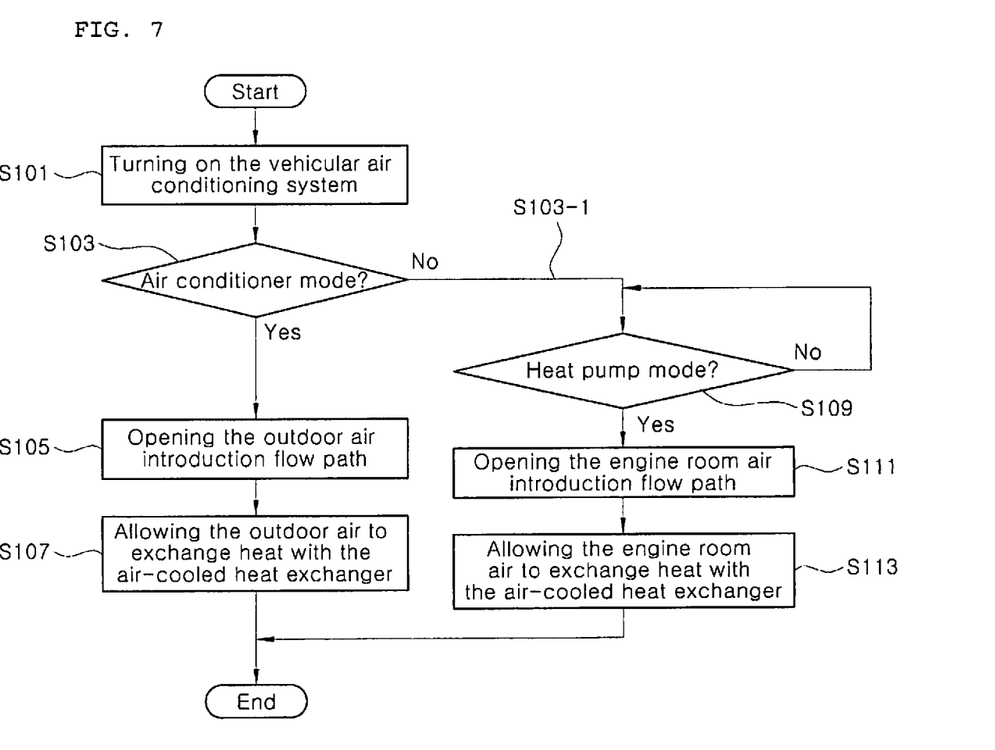
FIG. 7 is a flowchart showing an air conditioning control method which is performed using the vehicular air conditioning system according to the present invention.

Referring first to FIG. 7, the vehicular air conditioning system is turned on (S101). In this state, the control part 36 determines whether the vehicular air conditioning system is in an air conditioner mode (S103).

If it is determined that the vehicular air conditioning system is in the air conditioner mode, as shown in FIGS. 3 and 7, the control part 36 controls the position of the heat exchange air switching door 35 to open the outdoor air introduction flow path 34 (S105).

Then, the outdoor air having a low temperature is introduced through the outdoor air introduction flow path 34 and is supplied to the air-cooled heat exchanger 16 of the heat pump side refrigerant circulation line 10 so as to exchange heat with the air-cooled heat exchanger 16 (S107).

Therefore, the cooling efficiency of the refrigerant flowing through the internal flow path of the air-cooled heat exchanger 16 is enhanced so as to further reduce the temperature of the refrigerant introduced from the air-cooled heat exchanger 16 into the evaporator 18 and the chillers 19, thereby improving the passenger compartment cooling performance.

When introducing the outdoor air through the outdoor air introduction flow path 34, the outdoor air existing on the side of the cowl 40 is introduced. If necessary, the outdoor air existing on the side of the undercover 52 may be introduced.

Referring again to FIG. 7, if it is determined in step S103 that the vehicular air conditioning system is not in the air conditioner mode (S103-1), the control part 36 determines whether the vehicular air conditioning system is in a heat pump mode (S109).

If it is determined that the vehicular air conditioning system is in the heat pump mode, as shown in FIGS. 4 and 7, the control part 36 controls the position of the heat exchange air switching door 35 to open the engine room air introduction flow path 32 (S111).

Then, the engine room air having a high temperature is introduced through the engine room air introduction flow path 32 and is supplied to the air-cooled heat exchanger 16 of the heat pump side refrigerant circulation line 10 so as to exchange heat with the air-cooled heat exchanger 16 (S113).

Therefore, the cooling efficiency of the refrigerant flowing through the internal flow path of the air-cooled heat exchanger 16 is enhanced so as to further increase the temperature of the refrigerant introduced from the air-cooled heat exchanger 16 into the compressor 12.

As a result, the efficiency of the heat pump is enhanced so as to increase the heating temperature of the water-cooled heat exchanger 14. Thus, the heat having a higher temperature is supplied to the heater core side cooling water circulation line 20, thereby improving the passenger compartment heating performance.

According to the vehicular air conditioning system having such a configuration, the air-cooled heat exchanger 16 of the heat pump side refrigerant circulation line 10 is caused to exchange heat with the air. In the air conditioner mode, the air-cooled heat exchanger 16 is caused to exchange heat with the outdoor air existing outside the passenger compartment and having a relatively low temperature. In the heat pump mode, the air-cooled heat exchanger 16 is caused to exchange heat with the engine room air existing in the engine room and having a relatively high temperature. This makes it possible to enhance the heat exchange efficiency of the air-cooled heat exchanger 16 as far as possible.

Furthermore, since the heat exchange efficiency of the air-cooled heat exchanger 16 can be enhanced as far as possible, it is possible to enhance the air conditioner efficiency and the heat pump efficiency of the heat pump side refrigerant circulation line 10, consequently improving the heating/cooling performance of the heat pump side refrigerant circulation line 10.

Moreover, since the heating/cooling performance of the heat pump side refrigerant circulation line 10 can be improved, it is possible to enhance the passenger compartment heating/cooling performance.

In addition, since the passenger compartment heating/cooling performance can be enhanced by improving the heating/cooling performance of the heat pump side refrigerant circulation line 10, it is possible to improve the vehicle fuel efficiency.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system, comprising:
a heat pump side refrigerant circulation line including a compressor, a water-cooled heat exchanger, a heat pump mode expansion valve, an air-cooled heat exchanger, an air conditioner mode expansion valve and an evaporator,
a heater core side cooling water circulation line including a heater core and a water pump, and
a heat exchange air switching part including a cooling fan, an engine room air introduction flow path, an outdoor air introduction flow path and a controller,
and wherein the heat pump side refrigerant circulation line is configured to generate cold energy in the evaporator in an air conditioner mode and to generate heat in the water-cooled heat exchanger in a heat pump mode, and
the air-cooled heat exchanger is configured to allow a refrigerant to exchange heat with air in the air conditioner mode and the heat pump mode; and
the air-cooled heat exchanger serves as a condenser in the air conditioner mode, and serves as an evaporator in the heat pump mode, and
wherein the heat exchange air switching part is configured to switch the air exchanging heat with the air-cooled heat exchanger to an engine room air or an outdoor air depending on the air conditioner mode or the heat pump mode,
and wherein the air-cooled heat exchanger is installed in an engine room,
and wherein the outdoor air introduction flow path of the heat exchange air switching part is brought into communication with the outside of a passenger compartment through an air intake port formed in a cowl so as to introduce the outdoor air, and the engine room air introduction flow path is brought into communication with the engine room so as to introduce the engine room air.

2. The system of claim 1, wherein the heat exchange air switching part includes: the cooling fan configured to draw an air toward the air-cooled heat exchanger; the engine room air introduction flow path configured to introduce the engine room air toward the air-cooled heat exchanger; the outdoor air introduction flow path configured to introduce the outdoor air toward the air-cooled heat exchanger; a heat exchange air switching door installed between the engine room air introduction flow path and the outdoor air introduction flow path so as to block one of the engine room air introduction flow path and the outdoor air introduction flow path; and the controller configured to control the heat exchange air switching door to a position at which the engine room air introduction flow path is blocked or a position at which the outdoor air introduction flow path is blocked, depending on the air conditioner mode or the heat pump mode.

3. The system of claim 2, wherein the controller is configured to, in the air conditioner mode, control the heat exchange air switching door in such a direction as to block the engine room air introduction flow path so that the outdoor air can be introduced toward the air-cooled heat exchanger to exchange heat therewith, and is configured to, in the heat pump mode, control the heat exchange air switching door in such a direction as to block the outdoor air introduction flow path so that the engine room air can be introduced toward the air-cooled heat exchanger to exchange heat therewith.

4. A vehicular air conditioning system, comprising:
a heat pump side refrigerant circulation line including a compressor, a water-cooled heat exchanger, a heat pump mode expansion valve, an air-cooled heat exchanger, an air conditioner mode expansion valve and an evaporator,
a heater core side cooling water circulation line including a heater core and a water pump, and
a heat exchange air switching part including a cooling fan, an engine room air introduction flow path, an outdoor air introduction flow path and a controller,
and wherein the heat pump side refrigerant circulation line is configured to generate cold energy in the evaporator in an air conditioner mode and to generate heat in the water-cooled heat exchanger in a heat pump mode, and
the air-cooled heat exchanger is configured to allow a refrigerant to exchange heat with air in the air conditioner mode and the heat pump mode; and
the air-cooled heat exchanger serves as a condenser in the air conditioner mode, and serves as an evaporator in the heat pump mode, and
and wherein the heat exchange air switching part is configured to switch the air exchanging heat with the air-cooled heat exchanger to an engine room air or an outdoor air depending on the air conditioner mode or the heat pump mode, and
wherein the air-cooled heat exchanger is installed on a floor surface of an engine room, and
wherein the outdoor air introduction flow path of the heat exchange air switching part is brought into communication with the outside of a passenger compartment through an air intake port formed in an undercover of the engine room so as to introduce the outdoor air existing below the undercover, and the engine room air introduction flow path is brought into communication with the engine room so as to introduce the engine room air.

5. A method for controlling a vehicular air conditioning system of claim 1, the method comprising:
(a) allowing the air-cooled heat exchanger to exchange heat with an ambient air in the air conditioner mode and the heat pump mode while switching the air heat-exchanged in the air-cooled heat exchanger depending on the air conditioner mode or the heat pump mode.

6. The method of claim 5, wherein in (a), one of air having different temperatures is introduced toward the air-cooled heat exchanger depending on the air conditioner mode or the heat pump mode so that the one of the air having different temperatures can exchange heat with the air-cooled heat exchanger depending on a mode state.

7. The method of claim 6, wherein in (a), an engine room air or an outdoor air is introduced toward the air-cooled heat exchanger depending on the air conditioner mode or the heat pump mode.

8. The method of claim 7, wherein in (a), the outdoor air is introduced toward the air-cooled heat exchanger in the air conditioner mode so that the air-cooled heat exchanger can exchange heat with the outdoor air, and the engine room air is introduced toward the air-cooled heat exchanger in the heat pump mode so that the air-cooled heat exchanger can exchange heat with the engine room air.

9. The method of claim 8, wherein in (a), the outdoor air is introduced toward the air-cooled heat exchanger in the air conditioner mode.

10. The method of claim 8, wherein in (a), the outdoor air existing below an undercover of an engine room is introduced toward the air-cooled heat exchanger in the air conditioner mode.

11. A method for controlling a vehicular air conditioning system of claim 4, the method comprising:
(a) allowing the air-cooled heat exchanger to exchange heat with an ambient air in the air conditioner mode and the heat pump mode while switching the air heat-exchanged in the air-cooled heat exchanger depending on the air conditioner mode or the heat pump mode.

* * * * *